United States Patent Office 2,874,045
Patented Feb. 17, 1959

2,874,045

PROCESS OF WASHING AND PROTECTING PHOTOGRAPHIC SILVER IMAGES

Edwin H. Land, Cambridge, Mass., assignor to Polaroid Corporation, Cambridge, Mass., a corporation of Delaware No Drawing. Application February 26, 1954
Serial No. 412,944

15 Claims. (Cl. 96—29)

This invention relates to a composition of matter comprising a novel mixture of materials and, more particularly, to the washing and protecting of a photographic silver image by applying to at least one of its faces, in a layer, a composition containing water for dissolving residual water-soluble processing reagents from the image, and a novel mixture of materials for producing a protective coating on the image when the composition is dried.

Objects of the present invention are: to provide a process for increasing the stability of a photographic silver image with a novel composition comprising water for washing the image when the composition is applied and a dispersion of such materials for forming a coating upon the image when the composition is dried; to provide, as a novel product, a protected photographic image produced by such a process; to provide, for use in a process of the foregoing type, a composition comprising a mixture of a vinylpyridine polymer and a hydantoin formaldehyde condensation polymer; and to provide, for use in a process of the foregoing type, a composition comprising a mixture of these polymers and a salt of a heavy metal which forms an insoluble sulfide.

Other objects of the invention will in part be obvious and will in part appear hereinafter.

The invention accordingly comprises the several steps and the relation and order of one or more of such steps with respect to each of the others, and the composition and product possessing the feature, properties and relation of elements which are exemplified in the following detailed disclosure, and the scope of the application of which will be indicated in the appended claims.

The compositions of matter contemplated by the present invention generally comprise mixtures of compatible components which, together, possess properties not possessed by the components themselves. These components include a vinylpyridine polymer and a hydrantoin condensation polymer and, preferably, a salt of a heavy metal which forms an insoluble sulfide. The vinylpyridine polymer and the hydantoin condensation polymer function primarily to impart to the composition the following unusual combination: substantial impermeability to water; substantial impermeability to elemental sulfur, for example, from sulfur-containing materials with which the composition may come in contact; stability throughout wide temperature and humidity ranges; resistance to the effects of prolonged solar radiation; optical clarity; and nontackiness. The heavy metal salt functions primarily to impart to the composition excellent resistance to penetration by sulfides, for example, from the atmosphere.

Aqueous dispersions of such components are particularly useful in improving the stability of extremely thin photographic silver images of the type which may be produced by applying a processing composition containing a silver halide developer and a silver halide solvent to a photoexposed photosensitive silver halide element and an image-receptive element which are in superposed relation. The processing composition acts to reduce exposed silver halide to silver, to react with unreduced silver halide to form a water-soluble, complex silver salt, to transfer it to the image-receptive element and, there, to reduce it to silver.

An extremely thin, photographic silver image of the foregoing type ordinarily retains traces of the photographic reagents with which it has been processed and the continued presence of which may adversely affect its stability. For example, silver may be oxidized by sulfur from the residue of sodium thiosulfate which has been employed as a solvent. Also, silver may be oxidized by such agents as hydrogen sulfide often present in the atmosphere. Furthermore, traces of unoxidized developer, if oxidized by atmospheric oxygen, may slightly discolor the highlights of the image.

It has been proposed, in order to improve the stability of such an image, to coat it with a composition comprising an aqueous dispersion of a film-forming material. The water acts to wash traces of the photographic reagent from the image and to so distribute the film-forming material that it provides the image with a protective coating when the dispersion is dried. Processes of the foregoing type are more fully described in application Serial No. 302,746, Patent No. 2,719,791, filed in the name of Edwin H. Land on August 5, 1952, for Method of Improving the Stabilization of Finished Photographic Prints by Applying a Liquid Composition Thereto, and the Product of Said Method.

In accordance with the present invention, a preferred composition for this purpose comprises a dispersion prepared from (1) a vinylpyridine polymer, (2) a hydantoin formaldehyde condensation polymer, (3) a salt of a heavy metal which forms an insoluble sulfide, (4) water, (5) a water-miscible organic solvent and (6) an acid. This dispersion, because of its aqueous character, is readily adapted to dissolve residual water-soluble photographic processing reagents from a photographic image.

The vinylpyridine polymer may be a polyvinylpyridine such as poly-2-vinylpyridine, poly-3-vinylpyridine, poly-4-vinylpyridine, poly-2-vinyl-6-methyl pyridine, poly-2-methyl-5-vinylpyridine, and poly-2-vinyl-5-ethyl pyridine, or a copolymer in which a polyvinylpyridine is the characteristic ingredient, such as a copolymer of 2-vinyl-pyridine and methylacrylate, of 2-vinylpyridine and methyl methacrylate, of 2-vinyl-pyridine and methylvinyl ketone, and of 2-vinylpyridine and acrylamide. The preparation of such vinylpyridine polymers is illustrated in U. S. Patent No. 2,491,472, issued in the name of J. Harmon on December 20, 1949, for Polymerization of Vinyl Pyridines. The use of such vinylpyridine polymers is illustrated in U. S. patent application, Serial No. 359,438, now abandoned, filed by Edwin H. Land, Elkan R. Blout and Howard C. Haas on June 3, 1953, for Process of Washing and Protecting Photographic Silver Images, Photographic Materials Usable Therein and Photographic Products Thereof.

The coating formed when the preferred composition is applied to a silver image in a thin layer and dried is prevented from cracking by the hydantoin formaldehyde condensation polymer which plasticizes the vinylpyridine polymer. It has been found, for example, that high temperature and humidity cause the vinylpyridine polymer to harden and the hydantoin formaldehyde condensation polymer to soften, whereas low temperature and humidity cause the vinylpyridine polymer to soften and the hydantoin formaldehyde condensation polymer to harden. Accordingly, in a mixture of these materials, variations in their properties, which result from variations in ambient humidity, counteract each other. Also, it has been found that whereas a vinylpyridine polymer yellows under intense light, a mixture of these materials retains its optical clarity under prolonged exposure to sunlight. Furthermore, it has been found that hydantoin formaldehyde condensation polymers, unlike many conventional plasticizers for vinylpyridine polymers, do not render a coating containing a mixture of the two materials pervious to elemental sulfur which, for example, may originate in sulfur-containing cardboards that come into contact with the coating. A preferred hydantoin formaldehyde condensation polymer is dimethyl hydantoin formaldehyde. Best results are obtained when the vinylpyridine polymer ranges from 30% to 200% by weight of the hydantoin formaldehyde condensation polymer and, particularly, when the vinylpyridine polymer and the hydantoin formaldehyde condensation polymer are in approximately equal proportions.

The preferred composition contains a salt of a heavy metal which forms an insoluble sulfide in a concentration sufficient to provide the coating formed on the face of the image when the composition is dried with a quantity of salt which is large relative to the quantity of silver in the image. Consequently, in accordance with the law of mass action, atmospheric sulfides which penetrate the coating react with the heavy metal salt in preference to the silver of the image. Preferably, the concentration of the heavy metal salt, by total weight of the preferred composition, ranges approximately from 1% to 15%. The heavy metal salt, preferably water soluble for example, contains a heavy metal cation such as cadmium, lead, manganese, zirconium and tin and an anion such as acetate, sulfate, nitrate and formate. The quantity of salt, although large relative to the quantity of silver in the image, should be so small that the salt and its sulfide do not appreciably affect the appearance of the image. Heavy metal salts which are pale in appearance and which react to form pale sulfides are preferred. The salts of zinc, in particular, are preferred because they and their sulfides are white.

The organic solvent, examples of which are low molecular weight alcohols such as methanol, ethanol and propanol, dioxane and low molecular weight ketones such as acetone and methylethyl ketone, and the acid, preferably weak, examples of which are acetic acid and propionic acid, cooperate to cause the vinylpyridine polymer, which is ordinarily insoluble in water alone, to dissolve. It is believed that salt formation by a proportion of the acid and a proportion of the basic groups of the polymer is one of the driving forces for solution. In view of the fact that the heavy metal salt, if properly chosen, may be acidic enough to participate in solubilizing the polymer, the acid may be omitted if desired. The water-miscible organic solvent functions additionally to impart to the solution an overall quick-drying character.

The preferred composition may be prepared by dissolving the vinylpyridine polymer in the water, organic solvent and acid at a temperature ranging from room temperature to 40° C. under a reflux condenser to prevent evaporation of the alcohol. Thereafter, the dimethyl hydantoin formaldehyde and the heavy metal salt are stirred into the mixture. A preferred composition comprises the foregoing ingredients in the following proportions:

Vinylpyridine polymer_____g__ 10–25
Hydantoin formaldehyde condensation polymer
 g__ 5–30
Salt of heavy metal having insoluble sulfide___g__ 1–10
Water _____cc__ 50–70
Organic solvent_____cc__ 30–50
Weak acid_____cc__ 0–5

Examples of photographic materials useful in the production of the photographic silver images, to which the preferred composition may be most advantageously applied, are described in detail in Patent No. 2,543,181, issued in the name of Edwin H. Land on February 27, 1951, for Photographic Product Comprising a Rupturable Container Carrying a Photographic Processing Liquid and in Patent No. 2,647,056, issued in the name of Edwin H. Land on July 28, 1953, for One-Step Photographic Transfer Process. In a typical process employing such materials, a processing composition containing a viscous aqueous solution of a silver halide developer, a silver halide solvent and an alkali is spread in a uniformly thin layer between the superposed surfaces of the photoexposed gelatino silver halide stratum of a photosensitive element and the silver-receptive stratum of an image-receptive element. The elements are maintained in superposed relation for a predetermined period, ordinarily of approximately 40 to 120 seconds in duration, during which exposed silver halide is reduced to silver and unreduced silver halide forms a water-soluble, complex silver salt which diffuses through the layer of composition to the image-receptive stratum, where, upon being reduced to silver, it forms a silver print. At the end of this period, the photosensitive element, preferably together with the layer of composition, is stripped from the image-receptive element.

An image-receptive stratum of the foregoing type in one form includes silver precipitating nuclei dispersed in a macroscopically continuous vehicle comprising submacroscopic agglomerates of minute particles of a water-insoluble, inorganic, preferably siliceous, material such as silica aerogel. Silver grains precipitated in the foregoing manner are concentrated primarily at the surface of this stratum. This stratum, both before and after receiving these precipitated silver grains is extremely thin, preferably being approximately 1 to 8 microns thick. Materials of the foregoing type are specifically described in copending U. S. application Serial No. 727,385, filed by Edwin H. Land on February 8, 1947, for Photographic Product and Process and Serial No. 164,908, now abandoned, filed by Edwin H. Land on May 29, 1950, for Photographic Silver Halide Product and Process.

Preferably, there is interposed between the image-receptive stratum and its support a water-impermeable layer capable of preventing the penetration of moisture from the processing liquid into the support. This layer is responsible for the production of a substantially dry image only shortly after the photosensitive layer is stripped from it. The water-impermeable layer, for example, may be composed of unplasticized polymethacrylic acid or one of the cellulosic esters such as cellulose nitrate, cellulose acetate, cellulose butyrate, cellulose propionate, cellulose acetate butyrate, or cellulose acetate propionate. Preferred, however, are such rubbery polymers as polyvinyl butyral. If the support is water impermeable, of course, a discrete, water-impermeable layer need not be provided.

Alternatively, there is interposed between the image-receptive stratum and its support a plurality of layers which together impart not only impermeability to water but also to organic materials such as oils and plasticizers with which the support may come in contact. These layers are so constituted that one is impermeable to many of the organic materials which can penetrate the other. As a consequence, the two layers combined are impermeable to a wide variety of organic materials. Here, preferably, the two layers are formed of different high molecular weight polymers, i. e., plastics. Preferably, the layer adjacent to the support has a thickness of approximately .0004 inch and is formed of a cellulosic ester such as cellulose acetate which is free of plasticizer. Preferably, the layer which is remote from the support is a polyvinyl acetal such as polyvinyl butyral or an acrylic resin such as that sold under the trade name "Acryloid" and, in a preferred form, has a thickness of approximately .00015 inch. The plastic of the latter layer may contain a plasticizer such as dioctylphthalate, the methyl ester of rosin sold as Abalyn, the hydrogenated resin sold as Abytol, or the hydrogenated methyl ester rosin sold as Hercolyn, which are incompatible with cellulose acetate and therefore incapable of penetrating the former layer. A complete discussion of coacting layers of the foregoing type is found in the copending application of Edwin H. Land, Serial No. 401,022, Patent No. 2,789,054, filed December 29, 1953, for Print-Receiving Elements for Diffusion Transfer Reversal Processes and Film Assemblies Embodying Said Elements.

Preferably, the composition of the present invention is applied to a photographic silver image to be washed and protected by means of an absorbent applicator composed, for example, of flannel, cotton batting, or cellulose sponge charged with a composition. When the face of the image is swabbed with such an applicator residual reagents in the image are dissolved and for the most part transferred into the applicator and the image becomes coated with a thin layer of the dispersion. The dispersion can then be dried to form a protective coating.

The preferred composition referred to above, after being swabbed by means of such an absorbent applicator onto a thin photographic silver image of the above-described type, rapidly dried under ordinary atmospheric conditions to form a coating having excellent protective properties for the image.

Since certain changes may be made in the above process, composition and product without departing from the scope of the invention herein involved, it is intended that all matter contained in the above description shall be interpreted as illustrative and not in a limiting sense.

What is claimed is:

1. In a process for washing and protecting a transfer-diffusion photographic silver print containing a residue of the reagents with which it has been processed, the step of washing said reagents from said print by applying to one face thereof, in a thin layer, a composition comprising a dispersion prepared from a vinylpyridine polymer a hydantoin formaldehyde condensation polymer, a salt of a heavy metal which forms an insoluble sulfide, water and a water-miscible organic solvent, and the step of forming a protective coating on said print by drying said layer to produce a residue composed primarily of a mixture of said vinylpyridine polymer, said hydantoin formaldehyde condensation polymer and said salt of a heavy metal.

2. The process of claim 1 wherein said vinylpyridine polymer is polyvinylpyridine.

3. The process of claim 1 wherein said hydantoin formaldehyde condensation polymer is dimethyl hydantoin formaldehyde.

4. The process of claim 1 wherein said salt of a heavy metal is a zinc salt.

5. The process of claim 1 wherein said salt of a heavy metal is zinc acetate.

6. A method of producing a stable photographic print, said method comprising the steps of spreading, in a thin layer, between a siliceous silver-receptive stratum of an image-receptive sheet and an exposed gelatino silver halide stratum of a photosensitive sheet, an aqueous alkaline solution of a silver halide developer and a silver halide solvent whereby exposed silver halide in the silver halide stratum is reduced to silver and unreduced silver halide from the silver halide stratum forms a water-soluble, complex silver salt which diffuses through the layer of solution to the silver-receptive stratum where it is reduced to silver to form a visible print, stripping said silver halide stratum from said silver-receptive stratum whereby the print retains a residue of said solution, swabbing said print with an absorbent applicator charged with a composition containing an aqueous, water-miscible, organic solvent dispersion of a vinylpyridine polymer, a hydantoin formaldehyde condensation polymer and a salt of a heavy metal which forms an insoluble sulfide, and the step of drying said layer to produce a protective residue composed primarily of a mixture of said vinylpyridine polymer, said hydantoin formaldehyde condensation polymer and said salt of said heavy metal.

7. A method of producing a stable photographic print, said method comprising the steps of spreading, in a thin layer between a siliceous silver-receptive stratum of an image-receptive sheet and an exposed gelatino silver halide stratum of a photosensitive sheet, an aqueous alkaline solution of a silver halide developer and a silver halide solvent whereby exposed silver halide in the silver halide stratum is reduced to silver and unreduced silver halide from the silver halide stratum forms a water-soluble, complex silver salt which diffuses through the layer of solution to the silver-receptive stratum where it is reduced to silver to form a visible print, stripping said silver halide stratum from said silver-receptive stratum whereby the print retains a residue of said solution, swabbing said print with an absorbent applicator charged with a composition containing a dispersion in aqueous, hydrophilic, organic solvent solution of polyvinylpyridine and dimethyl hydantoin formaldehyde, and the step of drying said layer to produce a protective residue composed primarily of a mixture of said polyvinylpyridine and said dimethyl hydantoin formaldehyde.

8. In a process for washing and protecting a photographic transfer-diffusion silver print, the step of applying to one face thereof, in a thin layer, a composition comprising a dispersion prepared from a vinylpyridine polymer, a hydantoin formaldehyde condensation polymer, water and a water-miscible, organic solvent, and the step of forming a protective coating on said print by drying said layer to produce a residue composed primarily of a mixture of said vinylpyridine polymer and said hydantoin formaldehyde condensation polymer.

9. The process of claim 8 wherein said vinylpyridine polymer is polyvinylpyridine.

10. The process of claim 8 wherein said hydantoin formaldehyde condensation polymer is dimethyl hydantoin formaldehyde.

11. The process of claim 8 wherein said dispersion includes a salt of a heavy metal.

12. The process of claim 8 wherein said dispersion includes a zinc salt.

13. The process of claim 8 wherein said dispersion includes zinc acetate.

14. A method of producing a stable photographic print, said method comprising the steps of spreading, in a thin layer between a silver-receptive stratum of an image-receptive sheet and a gelatino silver halide stratum of an exposed photosensitive sheet, an aqueous alkaline solution of a silver halide developer and a silver halide solvent whereby exposed silver halide in the photosensitive stratum is reduced to silver and unreduced silver halide from the photosensitive stratum forms a water-soluble, complex silver salt that diffuses through the layer of solution to the silver-receptive stratum where it is reduced to silver to form a visible print, stripping said photosensitive stratum from said silver-receptive stratum whereby the print retains a residue of said solution, applying to said print a composition containing a dispersion, in a solution of water and a hydrophilic organic solvent, of a vinylpyridine polymer and a hydantoin formaldehyde condensation polymer, and drying said layer to produce a protective residue comprised primarily of a mixture of said vinylpyridine polymer and said hydantoin formaldehyde condensation polymer.

15. A method of producing a stable photographic print, said method comprising the steps of spreading, in a thin layer between a siliceous, silver-receptive stratum of an image-receptive sheet and an exposed gelatino silver halide stratum of a photosensitive sheet, an aqueous alkaline solution of a silver halide developer and a silver halide solvent whereby exposed silver halide in the silver halide stratum is reduced to silver and unreduced silver halide from the silver halide stratum forms a water-soluble, complex silver salt which diffuses through the layer of solution to the silver-receptive stratum where it is reduced to silver to form a visible print, stripping said silver halide stratum from said silver-receptive stratum whereby the print retains a residue of said solution, swabbing said print with an absorbent applicator charged with a composition containing a dispersion, in a solution of water and a hydrophilic organic solvent, of a vinylpyridine polymer and a hydantoin formaldehyde condensation polymer, and drying said layer to produce a protective residue composed primarily of a mixture of said vinylpyridine polymer and said hydantoin formaldehyde condensation polymer.

References Cited in the file of this patent
UNITED STATES PATENTS

| | | |
|---|---|---|
| 2,326,699 | Swain et al. | Aug. 10, 1943 |
| 2,364,172 | Stauffer | Dec. 5, 1944 |
| 2,391,181 | Minsk et al. | Dec. 18, 1945 |
| 2,448,508 | Alles | Sept. 7, 1948 |
| 2,633,423 | Bower et al. | Mar. 31, 1953 |
| 2,662,822 | Land | Dec. 15, 1953 |
| 2,719,791 | Land | Oct. 4, 1955 |
| 2,794,740 | Land et al. | June 4, 1957 |